July 30, 1935.    H. E. MORTON    2,009,670
FLASH REMOVING MACHINE
Filed Aug. 18, 1930    3 Sheets-Sheet 1

INVENTOR
Henry E. Morton,
BY
ATTORNEYS

July 30, 1935.                H. E. MORTON                2,009,670
                         FLASH REMOVING MACHINE
                         Filed Aug. 18, 1930           3 Sheets-Sheet 2
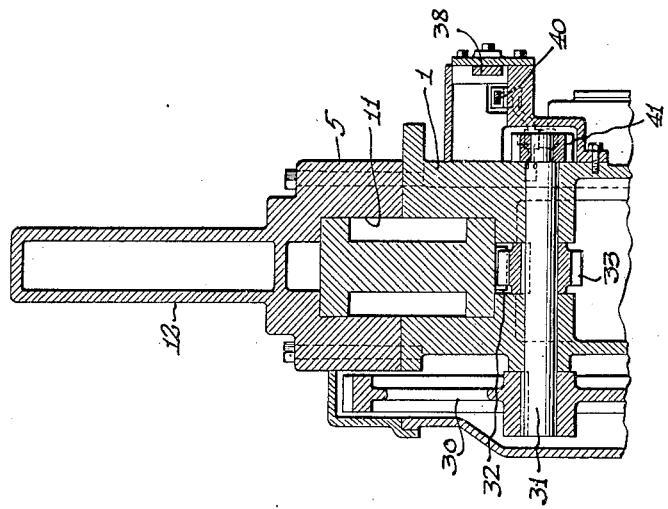
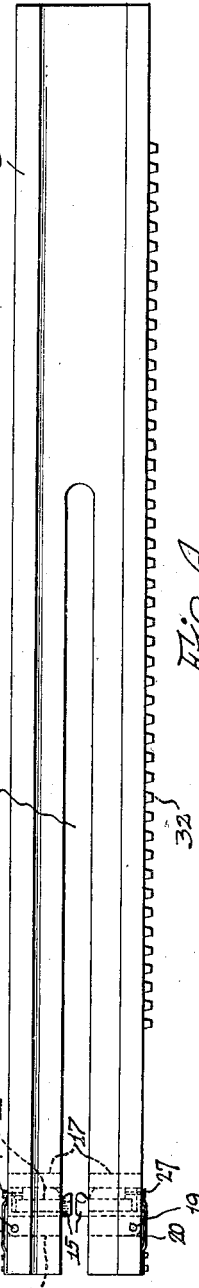
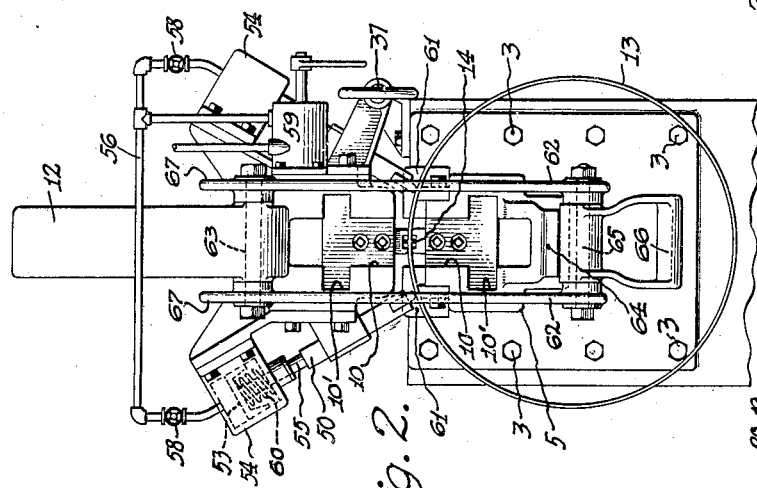
INVENTOR
Henry E. Morton,
BY
ATTORNEYS

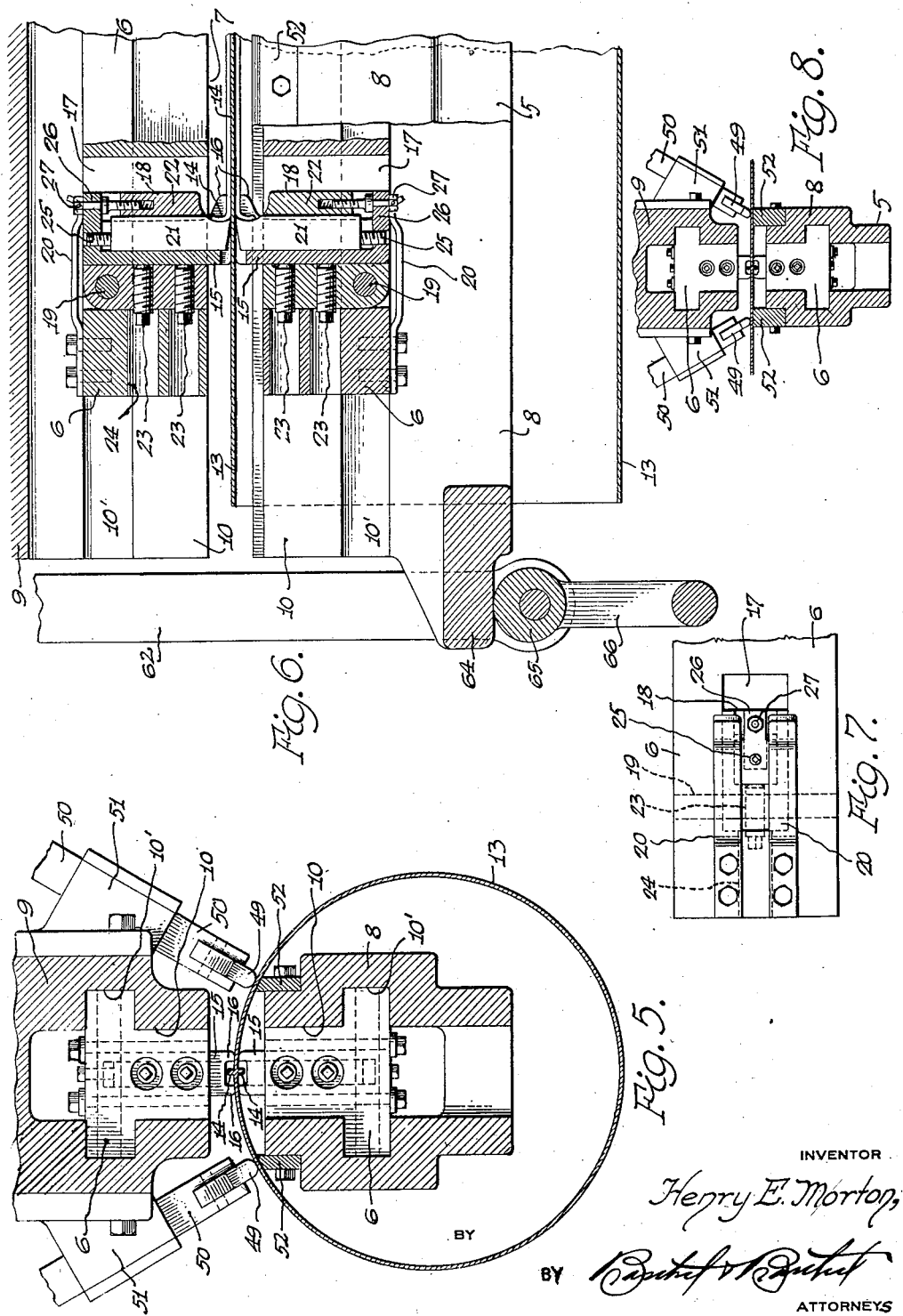

Patented July 30, 1935

2,009,670

UNITED STATES PATENT OFFICE 2,009,670

FLASH REMOVING MACHINE

Henry E. Morton, Muskegon Heights, Mich.

Application August 18, 1930, Serial No. 475,965

8 Claims. (Cl. 90—38)

This invention relates to a draw-cut shaper type of machine which is particularly adapted for removing the flash from butt welded seams, and its object is to provide a machine for the purpose which is rapid and accurate in operation, is provided with means for securely holding the work against deflection during the flash removing operation, is quickly adjustable for different lengths of work, and is arranged to simultaneously remove the flash from both sides of the seam whether such seam be in a tube or uniting two plates or other pieces of any shape.

With the above and other ends in view, the invention consists in the matters hereinafter set forth and more particularly pointed out in the appended claims, reference being had to the accompanying drawings in which—

Fig. 2 is an end elevation of the same;

Fig. 3 is a transverse section through a rear end portion of the machine substantially upon the line 3—3 of Fig. 1;

Fig. 4 is a side elevation of a tool carrying ram detached;

Fig. 5 is an enlarged transverse sectional detail substantially upon the line 5—5 of Fig. 1;

Fig. 6 is an enlarged sectional detail of the free end of the ram and the free end of its support;

Fig. 7 is a detail view showing the tool carrying end of the ram in plan view; and Fig. 8 is a sectional detail similar to that shown in Fig. 5 and showing a modified construction.

Figure 1:
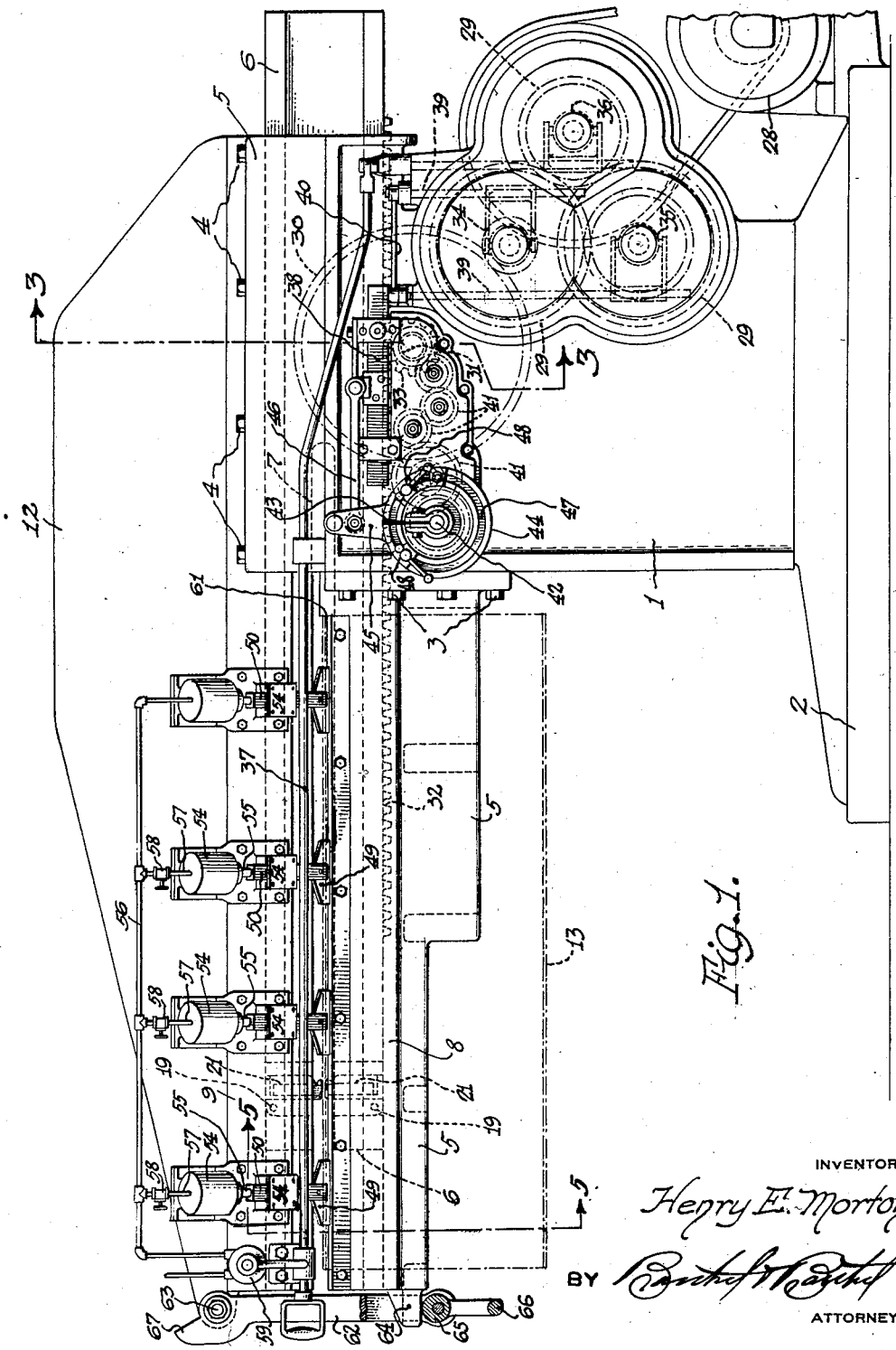
Figure 1 is a side elevation of a machine illustrative of an embodiment of the invention with parts broken away and in section.

As shown in the drawings, I indicates a suitable standard or pedestal having an extended base 2 to rigidly maintain it in a vertical position, and rigidly secured by bolts 3 and 4 to the upper end of this standard to extend a considerable distance laterally therefrom and across the upper end thereof, is an arm or horn indicated as a whole by the numeral 5 and forming a strong rigid guide way for a tool carrying ram 6, said ram being of I-beam formation in cross-section and provided with a longitudinal slot 7 open through one end of the ram and extending throughout a greater portion of its length. The guide or supporting arm 5 throughout the overhanging or laterally projecting portion thereof is divided by a transverse slot into a lower part 8 and an upper part 9 spaced apart by said slot which opens through the free end of said arm, each part being formed with a T-slot or guide way 10 for the I-beam or ram 6, the lateral flanges of which ram fit and are guided within the lateral grooves 10' of said guideway, the rear or solid end portion of the ram being accurately guided in a suitable guideway 11 (see Fig. 3) formed in the rear end of the supporting arm 5 which is bolted upon the upper end of the pedestal 1 and also in the upper end of said pedestal, extending across said end and through the rear end of said arm, said arm being strengthened and braced throughout its length against upward deflection by a hollow rib 12 formed integral therewith at its upper side and tapered toward the free or overhanging end of the arm.

The work 13 which, as shown in Fig. 1 in dotted lines and in Figs. 2, 5 and 6 in full lines, is a tube, the abutting edges of which are welded together in the usual manner forming a flash 14 along the seam within and without the tube, but it will be understood that the work may be in the form of flat plates as shown in Fig. 8 with their abutting edges welded together in a like manner, or said work may have any other form or shape having a welded seam or seams. This work is slipped endwise over the lower member 8 of the arm 5 or inserted into the slot between said members 8 and 9 and passes through the slot 7 in the ram 6 as said ram moves longitudinally across the work. The seam of the work is positioned at the longitudinal center line of said slots in the arm and ram so that said seam may be spanned by holding or clamping members 15 having side flanges at their adjacent ends forming toes 16 to engage the inner and outer surfaces of the work at opposite sides of the seam and adjacent thereto, these clamping or holding members being in directly opposed relation to each other, and adjustably secured within vertical openings 17 in the ram adjacent its forward end.

Each holding or clamping member 15 is held within a vertical opening in a carrier member 18 and each of these carrier members is pivotally supported within one of the openings 17 in the ram by a cross pin 19 to swing in said opening, the carrier member in the opening above the slot 7 being arranged to swing at its lower end within said slot longitudinally of the work, and the member in the opening below said slot 7 being supported to swing at its upper end in said slot longitudinally of the work. Each carrier member 18 is so pivotally positioned that said swinging movement is limited by said member coming in contact with the end wall of the opening 17 when it swings toward the adjacent end of the ram but has a limited swinging movement in the opposite direction within said opening 17, due to the length of said opening, and to normally swing said carrier members toward and into contact with the limiting end walls of the openings, flat springs 20 are secured at one end to the upper and lower sides of the ram with their free ends resting yieldingly upon the upper and lower ends of said carriers near the side thereof farthest away from their pivots 19. As the end walls of the openings 17 are vertical, the carrier is therefore normally and yieldingly held in a vertical position.

Each holder member 15 is formed with a groove in its side opposite that at which the pivot 19 is located, to receive a cutting tool 21 having an end cutting edge and this tool is securely held in place within the holder 15 between the back of each groove therein and an end wall 22 of the carrier, by set screws 23 passing through screw-threaded openings in said carrier into engagement with the holder to force said holder toward the wall 22 and securely clamp the tool in its holder, longitudinal openings 24 being provided in the end of the ram to give access to these screws so that they may be tightened. To further guard against movement of each tool in its holder, a screw 25 is screwed into a screw-threaded opening through an end wall 26 of the holder to engage the end of the tool so that by turning this screw the tool may be adjusted endwise in its holder, and each holder itself may be adjusted endwise in its carrier to adjust its foot 16 into proper contact with the work and at the same time adjust the tool longitudinally by providing a bolt 27 passing through an opening in the end portion of the extension end wall 26 of said holder into screw-threaded engagement with an opening in the upper edge of the wall 22 of said carrier. By turning these screws 27 the holders 15 carrying the tools 21, are thus adjusted endwise toward or from each other to adjust the cutting ends of the tools toward or from the work and to, at the same time, adjust the toes or inner ends 16 of said holders into proper engagement with the upper or outer surface and inner or lower surface of the work at opposite sides of and adjacent its seam.

As clearly illustrated in Fig. 6, the tools 21 are thus positioned to remove the flash 14 or extrusion along the seam at both the outer and inner sides of the work simultaneously, when said ram 6 is moved endwise upon its in-stroke by means, as indicated in Fig. 1, of power furnished by an electric motor 28 through a suitable drive chain and train of gearing indicated as a whole by the numeral 29 for imparting a slow motion to the ram, and applied through said gearing to a large gear 30 secured upon a transverse shaft 31 mounted in bearings upon the pedestal 1 and extending transversely of the ram just below the same, said ram being provided with teeth or a rack 32 on its lower side to be engaged by a small gear 33 secured upon said shaft 31, as clearly shown in Fig. 3. The direction of travel of the ram is controlled by suitable clutches 34 and 35 indicated in dotted lines in Fig. 1, and the stopping and starting of the machine is controlled by a similar clutch 36 operated by a push and pull rod 37 extending to the free end of the supporting arm 5 and connected at its rear end through suitable connections with said clutch 36. The clutches 34 and 35 are operated automatically to reverse the travel of the ram at each end of its stroke, by means of a slide bar 38 mounted for endwise movement adjacent the upper ends of rods 39 shown in dotted lines, and provided at their upper ends with suitable means for turning these rods simultaneously in the same direction, such means being connected for simultaneous movement by means of a connecting rod 40. This slide bar 38 is moved very slowly during the reciprocation of the ram, by transmitting motion from the shaft 31 through a train of gearing 41 indicated in dotted lines, said train imparting a very slow rotation to a shaft 42 upon the outer end of which is secured a radially extending arm 43 arranged to swing over the face of a wheel 44 loose on said shaft and having a laterally extending arm 45 which is pivotally connected to the slide 38 by means of a connecting rod 46. In the face of the wheel 44 is a concentric groove 47 along which stop members 48 are adjustable, these stop members being in the path of movement of the arm 43 so that when said arm engages one of said stops in its rotative movement with the shaft 42, the wheel 44 in one direction will be turned and through its connection with the slide bar 38 by means of the rod 46, move said bar to operate to throw out one of the clutches 34 and 35 and throw in the other, thus reversing the direction of travel of the ram 6. By adjusting the stops 48, the length of travel of the ram is determined and the reversing of the travel is made automatic. However any suitable, well known means may be employed for this purpose.

As previously stated, in placing the work 13 in the machine, it is inserted through the slot or space between the supporting and guiding arms 8 and 9 of the ram guide and through the longitudinal slot 7 opening through the end of the ram with said ram at the outer end of its stroke, the seam of the work being positioned to be spanned by the presser feet 16 of the holders 15, said holders being adjusted to engage the inner and outer or lower and upper surfaces of the work and slide thereon as the ram moves rearwardly and the flash 14 is removed by the tools 21, but to firmly clamp the work in this position against movement, suitable feet 49 are pivotally attached, each intermediate its ends to the lower end of a bar 50 of rectangular form in cross-section movable longitudinally in a suitable bearing 51, these bearings being secured to the sides of the upper member 9 of the guide for the ram, with these bearings inclined downwardly and inwardly to bring the feet 49 in contact with the work at each side of the seam beneath the overhanging end of said member 9. There are a number of these presser feet 49 spaced apart along the length of the work and to form anvils or supports beneath the work directly opposite these feet, a hardened strip or bar 52 is secured to the lower member 8 of the ram guide at each side thereof, so that when the work is in place, these feet may be forced downward by suitable pressure means hereinafter referred to, to forcibly clamp the work between these several feet and said anvils at each side of the seam of the work, these strips or anvils 52 being properly formed to conform to the curvature of the inner surface of a tube as shown, or to conform to the flat lower surface of butt welded plates as shown in Fig. 8. Where the seamed work has other forms, these anvils will be shaped accordingly, and any desired number or sets of these presser feet may be used, they being spaced apart along the length of the work as shown.

As shown in Figs. 1 and 2, means is provided for forcing each foot 49 toward its anvil 52 to clamp the work therebetween, said means for each foot comprising a piston 53 indicated in dotted lines in Fig. 2, each within a cylinder 54 with its rod 55 connected to the upper end of one of the bars 50 to the lower ends of which the clamping feet 49 are attached. There is one cylinder 54 for each bar 50 and fluid under pressure is supplied to all of these cylinders through a pipe line 56 extending adjacent to all of them with a branch 57 leading to each cylinder in each of which branches is a valve 58 by means of which the supply of fluid to any particular cylinder may be cut off, and supply to the line is controlled by a master valve 59 located adjacent the forward or overhanging end of the support 5. When fluid under pressure is admitted to the line 56 by the operation of the master valve, the pistons in these cylinders open to the line, are pressed downward, moving and holding the several feet 49 into clamping engagement with the work, and when this pressure is let off by the operation of the master valve, the several pistons will be moved upwardly in their cylinders by means of a spring 60 shown in dotted lines in Fig. 2, beneath each piston, thus moving the bars 50 upwardly and releasing the work. The supply of fluid under pressure to the line may be from any suitable source, and may be air or other fluid.

To take the endwise thrust of the cutting tools upon the work in removing the flash from the inner and outer or lower and upper sides of the seam, in placing the work in the machine, the rear edge of the work is placed against a shoulder 61 located at the forward end of the pedestal 1, the length of the overhanging end of the arm 5 may be operated upon, those presser feet not needed to clamp the work when the work is shorter than the arm, being rendered inoperative by shutting the valve 58 controlling the supply of fluid to the cylinders 54 operating these particular presser feet.

When the tools 21 are in operation, as shown in Fig. 6, there is a strain or force tending to spring the parts 8 and 9 of the overhanging end of the arm 5 away from each other, and to prevent such separation, a U-shaped lever or clamp 62 is pivotally attached at 63 to the extreme outer end of the upper part 9 of this arm, to be swung downward into engagement with a lug or projection 64 on the extreme end of the lower member 8 of said arm, said lever having a pivoted eccentric 65 on its lower end to engage beneath the lug 64 and then turned by means of its handle 66 (all as shown in Fig. 6) to bring the high side of said eccentric into engagement with said lug and firmly tighten the clamp, thus firmly holding the parts of the overhanging end of the supporting arm against separation or springing under cutting stresses. A lug 67 on this clamp projects laterally from its pivot 63 to limit the turning movement of the clamp and prevent its falling upon the pipe 56 or other parts of the machine when turned upwardly or to inoperative position for the insertion of the work endwise over the arm 8, as when the machine is being used to remove the flash from tubular work.

A material feature of the present machine is the provision of the vertical openings 17 in ram 6 in which openings the tool carrying members 18 are pivotally supported. As these openings are of greater length longitudinally of the ram, than is necessary to provide for the swinging movement of the tool carriers, the chips removed by the tools may escape through these openings, that is, the chips removed by the tool 21 carried by the lower part of the ram, may fall through the opening 17 and out of its lower end, and the chips removed from the upper side of the work by the tool carried by the upper part of said ram, may pass upwardly through said opening adjacent said tool. These openings are essential as otherwise the chips could not escape and would interfere with the operation due to the position of the work and the small space in which it is located between the tool carrying ram parts.

Obviously any suitable means may be employed for stopping and reversing the movement of the tool carrying ram and for driving said ram, and other changes may be made in the construction and arrangement within the scope of the appended claims without departing from the spirit of the invention. I do not, therefore, wish to limit myself to the particular construction or arrangement shown.

Having thus fully described my invention, what I claim is:—

1. In a machine for the purpose described, the combination of supporting means including a work supporting arm supported at one end with its opposite end portion free and divided inwardly from its projecting end to form a work receiving slot open at said end of said arm, a ram reciprocable longitudinally in a longitudinal way in said arm, said ram being divided inwardly from its outer end into upper and lower parts forming a work receiving slot opposite the slot in said arm, cutting tools adjustably mounted upon said ram with the cutting ends of said tools in spaced apart and opposed relation and with said ends projecting into contact with the work between said ram parts, means on said work supporting arm at the opposite ends of said slot therein for rigidly holding and clamping work in the path of said tools and between said ram parts, and means for reciprocating said ram.

2. In a machine for the purpose described, the combination of a work supporting arm of extended length supported adjacent one end and divided longitudinally inward from its opposite end to form a slot open at one end to receive work through the open end of said slot, a ram reciprocable in a longitudinal way in said arm, said ram being formed with a slot extending inward from one end thereof to receive work through said open end and opposite the division in said arm, means for rigidly securing work in position to extend through the division of said arm and slot in said ram transversely of said arm with a seam of the work extending longitudinally and centrally of said slot and including members carried by said ram and extending into said slot in opposed relation with their inner ends formed to span the seam of the work, cutting tools carried by said ram with their cutting ends extending into said slot and in directly opposed and spaced relation, and means for reciprocating said ram longitudinally of said arm.

3. In a machine for the purpose described, the combination of a work supporting arm of extended length supported adjacent one end and divided inwardly from its free end into two parts spaced apart to form a work receiving slot open through said end to freely receive work inserted therein, and formed with a longitudinal guideway throughout its length, a ram longitudinally reciprocable in said guideway in said arm and formed with a longitudinal slot opening through one end thereof to form an open ended slot to receive work and positioned opposite the space between said parts of said arm tools carried by said ram with their cutting ends projecting into said slot and in directly opposed relation, members carried by said arm and extending in opposed relation into said slot at each side of said tools to span a seam of the work and to contact the surfaces of the work adjacent to and at each side of said tools, means for adjusting said members toward and from each other into contact with opposite sides of the work, means for adjusting said tools toward and from each other independently of said ram, and means for reciprocating said ram.

4. In a machine for the purpose described, the combination of a work supporting arm divided longitudinally inward from one end into two parts and formed with a longitudinal guideway, a ram reciprocable in said guideway and divided longitudinally inward from one end to form a slot opening through one end of said ram and also formed with a transverse opening open into said slot, means for reciprocating said ram in its guide way, tools carried by said ram at each side of said slot with their cutting ends projecting into said slot, a carrier member in said transverse opening in said ram for each tool and having a foot to engage the work at opposite sides of a seam therein and at opposite sides of each tool, anvil members on one part of said arm at opposite sides of said slot therein, presser feet on the other part of said arm to press the work into firm contact with said anvil members, means for actuating said presser feet, and means for reciprocating said ram.

5. In a machine of the character described, the combination of a supporting arm supported adjacent one end to extend laterally from its support and comprising upper and lower parts, a ram reciprocable in said arm longitudinally thereof and comprising upper and lower parts to form a slot open through one end thereof with said slot opposite the space between the parts of said arm, a pair of tools carried by said ram with one tool at each side of said slot in said ram and with their cutting ends projecting into said slot, means for reciprocating said ram and reversing the movement thereof at each end of its stroke, and clamping means at the free end of said arm to tie the upper and lower parts of said arm together against cutting strains imposed by said tools and tending to separate the parts of said arm and ram.

6. In a machine for the purpose described, the combination of a work supporting arm divided longitudinally inward from one end into two parts and formed with a longitudinal guideway, a ram reciprocable in said guideway and comprising two parts each formed with a transverse opening opposite said opening in the other part, a tool carrier pivotally mounted in each opening, a tool carried by each carrier and adjustable therein with the cutting ends of said tools projecting into said space between said ram parts to engage the surface of work held by said arm, said openings in said ram parallel with said ram, said ram parts being of greater length than the width of said carriers to provide for the escape of chips removed from said work by said tools, and means for reciprocating said ram.

7. In a machine for the purpose described, the combination of a supporting member, a ram reciprocable in said supporting member and divided longitudinally to provide a slot extending inwardly from one end of said ram to receive work, tool carriers pivotally secured within openings in said ram at opposite sides of said slot, tools carried by said carriers with their cutting ends projecting into said slot to engage the work, said openings in which said tool carriers are mounted being of greater length than the width of said carriers, to permit the escape of chips removed from the work by said tools, means for yieldingly resisting pivotal movement of said carriers, and means for reciprocating said ram.

8. In a machine for the purpose described, the combination of a supporting pedestal, a work supporting arm secured at one end to said pedestal to extend laterally therefrom, said arm being divided longitudinally inward from one end into upper and lower parts and formed with a longitudinal guideway at the adjacent sides of said parts, a ram reciprocable in said guideway and divided longitudinally to form upper and lower parts between which work is adapted to be placed and with opposed openings, tool carriers adjustable in said openings, tools carried by said tool carriers to engage the upper and lower sides of work extending transversely of said arm and ram through the space between the parts thereof, and means for reciprocating said ram.

HENRY E. MORTON.